A. N. Parkhurst.

Pump.

No. 6669 Reissued Sept. 28, 1875

Witnesses;
E. Thurber
H W Wells

Inventor;
A. N. Parkhurst

N. PETERS, PHOTO-LITHOGRAPHER, WASHINGTON, D. C.

UNITED STATES PATENT OFFICE.

ALINUS N. PARKHURST, OF LOGANSPORT, INDIANA.

IMPROVEMENT IN PUMPS.

Specification forming part of Letters Patent No. 96,475, dated November 2, 1869; reissue No. 6,669, dated September 28, 1875; application filed August 16, 1875.

*To all whom it may concern:*

Be it known that I, A. N. PARKHURST, of Logansport, in the county of Cass and State of Indiana, have invented certain new and useful Improvements in Pumps; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1:
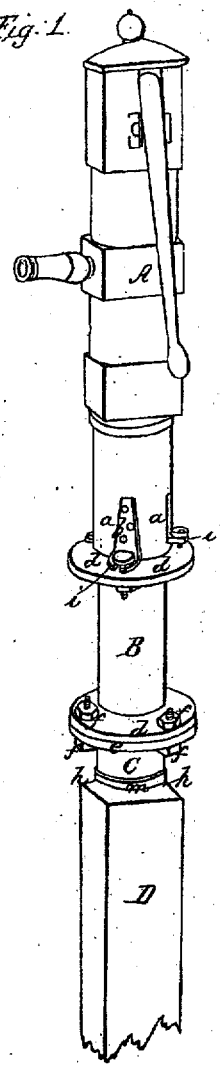
Figure 2:
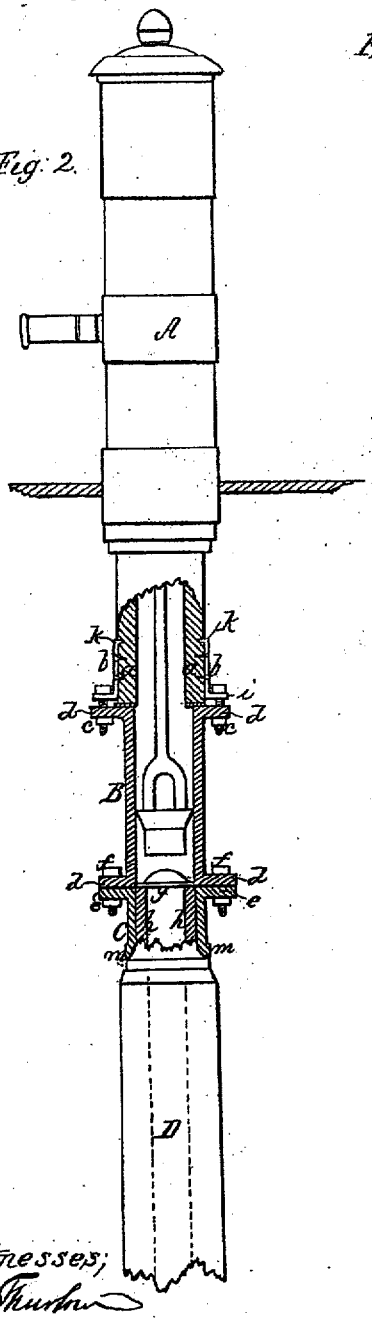
Figure 4:
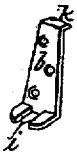
Figure 3:
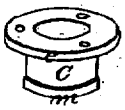

Figure 1 is a perspective view of my improved pump; Fig. 2, a vertical section; Fig. 3, a view of flanged collar detached from the tubing of pump; Fig. 4, a view of clamp detached from the tubing of pump.

Like letters in all the figures of the drawings indicate like parts.

This invention consists of clamps, provided with jaws to receive the bolts, and fastened to the stock of the pump, in combination with the piston-chamber, so as to dispense with the weight and expense of a heavy cast-iron flange, by which the pump and tubing is usually attached to the platform; also of a flanged collar, driven onto the end of the tubing, in combination with the chamber, so that the valve can be readily reached for repairs, as will be hereinafter more fully explained.

A is the stock or top of the pump; B, the chamber, which is made of stone-baked clay, glazed or vitrified on the interior, and having flanges *a a* on its ends, provided with bolt-holes; C, the tubing of the pump. D are the clamps, provided each with a claw, *b*, and jaws *c c;* and E the flanged collar, provided with bolt-holes to correspond with those in the flange of chamber, and having an enlargement or annulet, *d*, for strengthening the collar, so as to prevent its spreading or bursting when driving it onto the end of the tubing C. The lower inner edge of the collar is tapered, so that it will wedge itself tightly onto the tubing, which forms the valve-seat *e* at or near the junction of the collar with the chamber.

The clamps are placed around the base of stock A, with their claws *b* made to bite into the wood, and further fastened by means of screws. The chamber is secured by bolts *m*, which are passed between the jaws *c c*, and thence through the bolt-holes in the flange of chamber, whence they are fastened by screw-nuts. The lower end of the chamber is fastened to the collar by bolts in the same manner. Suitable packing is placed between the joints to make the pump water-tight.

Having thus fully described my invention, what I claim therein as new, and desire to secure by Letters Patent, is—

1. A flanged collar, having its inner lower end tapered or rounded off, and its outer side strengthened by an enlargement, in combination with the tubing and piston-chamber of the pump, substantially as and for the purpose set forth.

2. The combination of clamps D, provided with claws *b* and jaws *c c*, stock A, chamber B, flanged collar E, having an annulet, *d*, and its inner lower edge tapered, and tubing C, constructed substantially as described.

In testimony that I claim the foregoing I have hereunto set my hand this 17th day of July, A. D. 1875.

ALINUS N. PARKHURST.

Witnesses:

STEWART T. MCCONNELL,
JAMES THOMAS.